(12) United States Patent
Breedvelt-Schouten et al.

(10) Patent No.: US 7,721,189 B2
(45) Date of Patent: May 18, 2010

(54) SYSTEM FOR AND METHOD OF PROVIDING OVERVIEW OF A WORKSHEET IN AN ELECTRONIC REPORT

(75) Inventors: Ilse Breedvelt-Schouten, Manotick (CA); Gianna Mauro, Ottawa (CA); Lesley Grignon, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 11/473,371

(22) Filed: Jun. 22, 2006

(65) Prior Publication Data
US 2007/0157074 A1 Jul. 5, 2007

(30) Foreign Application Priority Data
Sep. 13, 2005 (CA) .................... 2519003

(51) Int. Cl.
*G06F 17/00* (2006.01)
(52) U.S. Cl. ..................................... 715/213
(58) Field of Classification Search ................. 715/212, 715/213, 227, 217
See application file for complete search history.

(56) References Cited

U.S. PATENT DOCUMENTS

| 6,104,872 | A  | * | 8/2000  | Kubota et al. ............... 717/110 |
| 7,007,229 | B2 | * | 2/2006  | DelGobbo et al. .......... 715/212 |
| 7,082,572 | B2 | * | 7/2006  | Pea et al. .................... 715/720 |
| 7,155,404 | B1 | * | 12/2006 | Johnson et al. .............. 705/19 |
| 7,249,316 | B2 | * | 7/2007  | Collie et al. ................ 715/209 |
| 2003/0028413 | A1 | * | 2/2003  | White et al. ................... 705/10 |
| 2004/0116966 | A1 | * | 6/2004  | Calibaba ......................... 607/5 |
| 2006/0112056 | A1 | * | 5/2006  | Sullivan et al. ............... 706/47 |
| 2006/0112329 | A1 | * | 5/2006  | Collie et al. ................ 715/513 |
| 2006/0253781 | A1 | * | 11/2006 | Pea et al. ..................... 715/723 |
| 2006/0288267 | A1 | * | 12/2006 | DeSpain ..................... 715/503 |
| 2007/0050697 | A1 | * | 3/2007  | Lewis-Bowen et al. ..... 715/503 |
| 2007/0079230 | A1 | * | 4/2007  | Vignet ......................... 715/504 |
| 2007/0266341 | A1 | * | 11/2007 | Bicker et al. ................ 715/810 |
| 2009/0132316 | A1 | * | 5/2009  | Florance et al. ................ 705/7 |

OTHER PUBLICATIONS

Steiner et al., An Automated Template Approach for Generating Web-Based Conversation Planning Worksheets, Google 2006, pp. 1181-1186.*

Tereba, Tools for Analysis of Population Statistics, Google 1999, pp. 14-16.*

* cited by examiner

*Primary Examiner*—Cong-Lac Huynh
(74) *Attorney, Agent, or Firm*—Shumaker & Sieffert, P.A.

(57) ABSTRACT

A worksheet overview system comprises an item information handler, an overview element handler, an overview area handler, and an overview synchronizer. The item information handler obtains item information relating to items of a worksheet. The overview element handler manages overview elements based on the item information. Each overview element represents item information of a corresponding item of the worksheet. The overview area handler provides an overview area for containing the overview elements to make the overview elements contained in the overview area accessible by a user. The overview synchronizer synchronizes between each overview element in the overview area and its corresponding item of the worksheet.

21 Claims, 15 Drawing Sheets

Figure 3

| Revenue | 1993 | 1994 | Date |
|---|---|---|---|
| Dishwashers | 415123 | 523034 | 938157 |
| Stoves | 549947 | 404153 | 954100 |
| Microwaves | 269785 | 345960 | 615745 |
| Line | 1234855 | 1273147 | 2508002 |

Figure 4

| Revenue | 1993 | 1994 | Date |
|---|---|---|---|
| Dishwashers | 415123 | 523034 | 938157 |
| Stoves | 549947 | 404153 | 954100 |
| Microwaves | 269785 | 345960 | 615745 |
| Line | 1234855 | 1273147 | 2508002 |

Figure 5

| Revenue | 1993 | 1994 | Date |
|---|---|---|---|
| Dishwashers | 67120 | 61380 | 128500 |
| Stoves | 99487 | 100870 | 200357 |
| Microwaves | 50344 | 69348 | 119692 |
| Line | 216951 | 231598 | 448549 |

Rows: Line | Market (list) — 112, 160
Columns: Date
Context: NY

Filters are applied. See the Properties pane for more details.

| Revenue | | 1993 | 1994 | Date |
|---|---|---|---|---|
| Stoves | Builders | 0 | 11772 | 11772 |
| | Department | 90522 | 75220 | 165742 |
| | Furniture | 0 | 10557 | 10557 |
| | *Total* | 90522 | 97549 | 188071 |
| Subtotal (included) | Builders | 0 | 11772 | 11772 |
| | Department | 90522 | 75220 | 165742 |
| | Furniture | 0 | 10557 | 10557 |
| | *Total* | 90522 | 97549 | 188071 |
| *Subtotal (excluded)* | Builders | 23320 | 13104 | 36424 |
| | Department | 47355 | 102146 | 149501 |
| | Furniture | 8550 | 11036 | 19586 |
| | *Total* | 79225 | 126286 | 205511 |
| Line | Builders | 23320 | 24876 | 48196 |
| | Department | 137877 | 177366 | 315243 |
| | Furniture | 8550 | 21593 | 30143 |
| | *Total* | 169747 | 223835 | 393582 |

Figure 14

Rows: Line | Market (list) | Mea... — 102, 170
Columns: Date
Context: NY

Filters are applied. See the Properties pane for more details.

| | | | 1993 | 1994 | Date |
|---|---|---|---|---|---|
| Stoves | Builders | Revenue | 0 | 11772 | 11772 |
| | | Cost | 0 | 8720 | 8720 |
| | Department | Revenue | 90522 | 75220 | 165742 |
| | | Cost | 73700 | 57300 | 131000 |
| | Furniture | Revenue | 0 | 10557 | 10557 |
| | | Cost | 0 | 7680 | 7680 |
| | *Total* | Revenue | 90522 | 97549 | 188071 |
| | | Cost | 73700 | 73700 | 147400 |

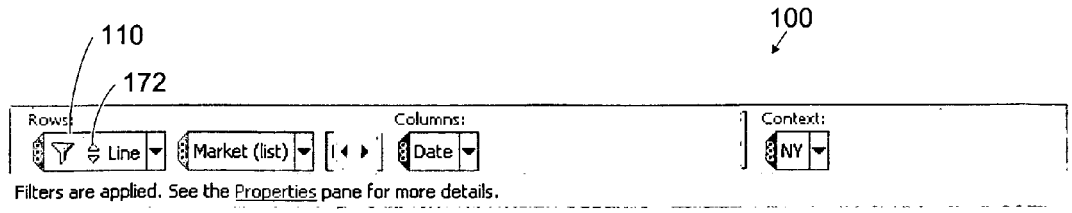
Figure 15
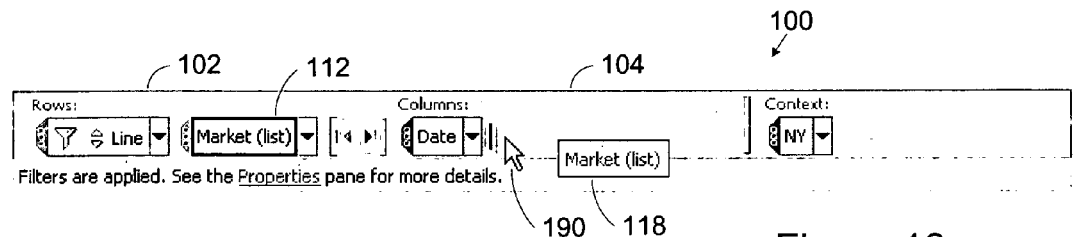
Figure 16
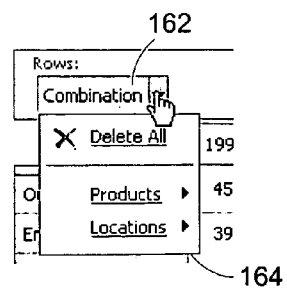
Figure 16A
Figure 16B

Figure 16C

| | 1996 | 1997 | Years |
|---|---|---|---|
| O[utdoor Products] | | | 880,453 |
| E[nvironmental Line] | | | 1,082,594 |
| GO Sport Line | | | 302,216 |
| Products | | | 2,265,263 |
| Far East | | | 381,053 |
| Europe | | | 813,550 |
| North America | | | 1,070,660 |
| Locations | | | 2,265,263 |

Menu (166): Delete All, Products ▸ (Outdoor Products, Environmental Line, GO Sport Line), Locations ▸, Delete, Search..., Filter..., Filter as Context Rows: Combination | Columns: Years

Figure 16D

Rows: Combination (162) | Channels (168) | Columns: (102) Years | Context: (100)

| | Revenue | 1996 | 1997 | Years |
|---|---|---|---|---|
| Outdoor Products | Independent | 27,940 | 61,953 | 89,893 |
| | Sports Chain | 81,262 | 99,622 | 180,884 |
| | Camping Chain | 151,757 | 143,508 | 295,265 |
| | Mass Marketer | 85,102 | 90,442 | 175,544 |
| | GO Outlet | 105,101 | 33,766 | 138,867 |
| | Channels | 451,162 | 429,291 | 880,453 |
| Environmental Line | Independent | 39,239 | 57,055 | 96,294 |
| | Sports Chain | 92,781 | 169,995 | 262,776 |
| | Camping Chain | 116,682 | 209,580 | 326,262 |
| | Mass Marketer | 84,958 | 172,298 | 257,256 |
| | GO Outlet | 64,170 | 75,836 | 140,006 |
| | Channels | 397,830 | 684,764 | 1,082,594 |
| GO Sport Line | Independent | 25,456 | 11,920 | 37,376 |
| | Sports Chain | 50,872 | 42,504 | 93,376 |
| | Camping Chain | 29,184 | 43,776 | 72,960 |
| | Mass Marketer | 22,240 | 50,800 | 73,040 |
| | GO Outlet | 10,224 | 15,240 | 25,464 |
| | Channels | 137,976 | 164,240 | 302,216 |
| Products | Independent | 92,635 | 130,928 | 223,563 |
| | Sports Chain | 224,915 | 312,121 | 537,036 |
| | Camping Chain | 297,623 | 396,864 | 694,487 |

(120)

| Revenue | 1993 | 1994 | Date |
|---|---|---|---|
| Dishwashers | 56710 | 233298 | 290008 |
| Stoves | 63478 | 80227 | 143705 |
| Microwaves | 71635 | 43330 | 114965 |
| Line | 191823 | 356855 | 548678 |

120

232   230

New

Default measure:   Revenue ▼ ; Show values as actual values ▼
Rows:   Line
Columns:   Date
Context:   Market = Builders
Report options:   No title, No subtitle, Show filters at the beginning, Page breaks (none), Portrait, Default paper size ✎

[ OK ]  [ Cancel ]  [ Apply ]

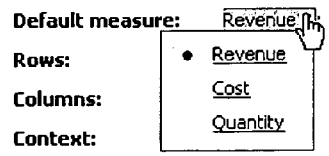
Figure 21
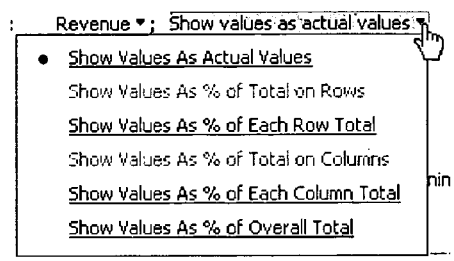
Figure 22
| Revenue | 1993 | 1994 | Date |
|---|---|---|---|
| Dishwashers | 56710 | 233298 | 290008 |
| Stoves | 63478 | 80227 | 143705 |
| Microwaves | 71635 | 43330 | 114965 |
| Line | 191823 | 356855 | 548678 |
— 120
— 240
Line
| Display: | Visible items (Default) ▼; No hidden items; Subtotals (Total, More & hidden, Included, Excluded) ▼ |
| | Attributes (none) |
Definition ▼
| Filter: | No top or bottom ▼; No expression ✐; No excluded items |
| Context: | Market = Builders |
| Sort: | No sort ▼ |
[ OK ] [ Cancel ] [ Apply ]
Figure 23

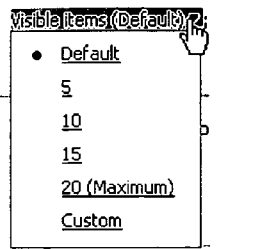
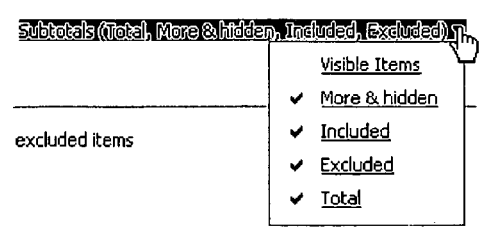
Figure 24
Figure 25
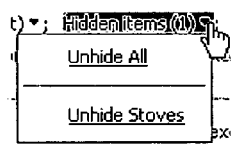
Figure 26
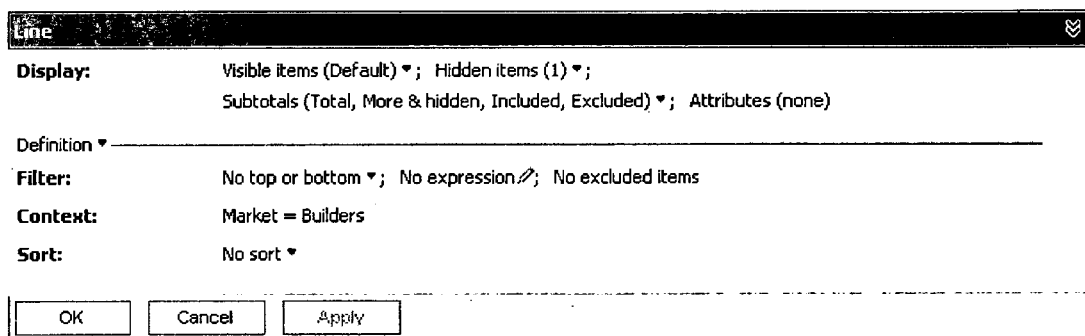
Figure 27
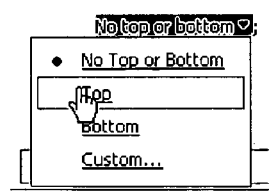
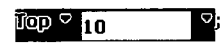
Figure 28
Figure 29

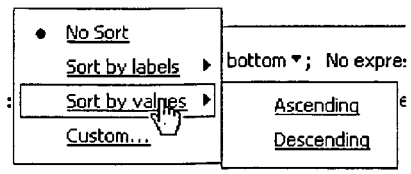

Figure 32

| Kitchen Supplies | ≫ |
|---|---|
| Name: | Kitchen Supplies ✏ |
| Path: | All Products.Products.Kitchen Supplies |
| Level: | Product Line |
| Set: | Products |
| Description: | No description available |

| OK | Cancel | Apply |

Figure 33

| Cost | ≫ |
|---|---|
| Name: | Cost ▼; Show values as actual values ▼ |
| Path: | Measures.Cost |
| Expression: | UnitCostItem*3 |
| Description: | No description available |

| OK | Cancel | Apply |

Figure 34

| Kitchen Supplies, 2004 | ≫ |
|---|---|
| Value: | 300,000 |
| Row: | Kitchen Supplies (Products) |
| Column: | 2004 (Years) |
| Measure: | Cost ▼; Show values as actual values ▼ |

| OK | Cancel | Apply |

Figure 35

SYSTEM FOR AND METHOD OF PROVIDING OVERVIEW OF A WORKSHEET IN AN ELECTRONIC REPORT

CROSS-REFERENCE TO RELATED APPLICATIONS

This application claims priority to Canadian Patent Application Serial No. 2,519,003 filed on Sep. 13, 2005.

FIELD OF INVENTION

The disclosed embodiments relate to a system for and method of providing an overview of a worksheet in an electronic report.

BACKGROUND OF THE INVENTION

In the Business Intelligence (BI) analysis domain, various data is presented to users in a form of a worksheet, such as a dimensional cross tabulation (crosstab) or a chart. Business analysts needs to be able to manipulate a dimensional crosstab and chart in a variety of ways. Next to seeing the actual values in the crosstab or chart, it is important for the analysts to get feedback on what filter criteria are applied to the displayed data. It is desirable for analysts to be able to get a fast overview of the data shown in a worksheet.

Individual filters applied to a dimensional crosstab consist in most cases of one single dimension category, which is called a "member" in Multi Dimensional Expression (MDX). For example, a crosstab can consist of products in the rows, years in the columns and revenue as measure. The values shown for the measure can be filtered using a single category (e.g. region "USA"), using an expression (e.g. where the product values for 1996 is more than 500M) or of a list of selected categories (e.g. a list or order methods: E-mail, Telephone, Mail). The filtering of the values in the crosstab can also be based on a combination of all these types of filters. For a user, it is desirable to easily view, create, update and delete these filter criteria.

In a dimensional crosstab, users can have multiple data sets on the rows and/or columns. A data set is a collection of categories from one dimension. On an edge (axis), it is possible to have a combination of multiple data sets. The data sets on such an edge (axis) can come from different dimensions, but also from the same dimension. In the crosstab itself, it is often difficult to see what the structure of the data is. When the crosstab is large, users may have to scroll or navigate to see what is actually in the crosstab. It is desirable for users to easily see what the crosstab structure is, and to be able to manipulate and navigate the data in a small screen real estate solution.

Some existing BI tools have a user interface that provides a dimension line or menu where all the dimensions available in the data source are shown. In this type of dimension line, every item is shown at the highest level in the dimension. If a user wants to filter the values on an item (e.g., priority), the user selects the item "Priority" in the dimension line to open a Priority menu and selects a desired category in the Priority menu. The selection of a category changes the values in the crosstab. In the menu, the selected filter is shown highlighted or in bold. This type of menu provides limited options and it is not possible for the users to manipulate the filter criteria further. Showing all dimensions consumes screen real-estate, and it is confusing to the users and makes it difficult to locate a desired dimension. The type of filter that can be shown in the menu is also limited to a single category within a dimension.

Another existing prior art shows the data structure near the rows for the row dimensions and near the columns for the column dimensions, and the overall filters in a separate container above or below the crosstab. This approach needs a relatively large screen real estate, and there is no coherence between these elements.

It is therefore desirable to provide a mechanism to provide information of crosstab in an efficient manner using a relatively small real estate.

SUMMARY OF THE INVENTION

The aspects of the disclosed embodiments provide an improved system and method that obviates or mitigates at least one of the disadvantages of existing systems.

One aspect of the invention uses an overview area that provides an overview of a worksheet.

In accordance with an aspect of the invention, there is provided a worksheet overview system comprising an item information handler, an overview element handler, an overview area handler, and an overview synchronizer. The item information handler is provided for obtaining item information relating to items of a worksheet. The overview element handler is provided for managing overview elements based on the item information, each overview element representing item information of a corresponding item of the worksheet. The overview area handler is provided for providing an overview area for containing the overview elements to make the overview elements contained in the overview area accessible by a user. The overview synchronizer is provided for synchronizing between each overview element in the overview area and its corresponding item of the worksheet.

In accordance with another aspect of the invention, there is provided a method of providing an overview of a worksheet. The method comprises obtaining item information relating to items of a worksheet; providing an overview area on a display; presenting one or more overview elements in the overview area based on the item information, each overview element representing item information of a corresponding item of the worksheet; and synchronizing between each overview element in the overview area and its corresponding item of the worksheet.

In accordance with another aspect of the invention, there is provided a computer readable medium storing instructions and/or statements for use in the execution in a computer of a method of providing an overview of a worksheet. The method comprises obtaining item information relating to items of a worksheet; providing an overview area on a display; presenting one or more overview elements in the overview area based on the item information, each overview element representing item information of a corresponding item of the worksheet; and synchronizing between each overview element in the overview area and its corresponding item of the worksheet.

In accordance with another aspect of the invention, there is provided a propagated signal carrier containing computer executable instructions and/or statements that can be read and executed by a computer, the computer executable instructions being used to execute a method of providing an overview of a worksheet. The method comprises obtaining item information relating to items of a worksheet; providing an overview area on a display; presenting one or more overview elements in the overview area based on the item information, each overview element representing item information of a corresponding item of the worksheet; and synchronizing between each overview element in the overview area and its corresponding item of the worksheet.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 3 is a diagram showing an example of an overview area provided by the worksheet overview system;

FIG. 4 is a diagram showing another example of an overview area;

FIG. 5 is a diagram showing another example of an overview area;

FIG. 11 is a diagram showing another example of an overview area;

FIG. 12 is a diagram showing another example of an overview area;

FIG. 13 is a diagram showing another example of an overview area;

FIG. 14 is a diagram showing another example of an overview area;

FIG. 15 is a diagram showing another example of an overview area;

FIG. 16 is a diagram showing another example of an overview area;

FIG. 16A is a diagram showing another example of an overview area;

FIG. 16B is a diagram showing an example of a combination menu;

FIG. 16C is a diagram showing another example of an overview area;

FIG. 16D is a diagram showing another example of an overview area;

FIG. 21 is a diagram showing a part of the properties pane;

FIG. 22 is a diagram showing another part of the properties pane;

FIG. 23 is a diagram showing another example of a properties pane;

FIG. 24 is a diagram showing a part of the properties pane;

FIG. 25 is a diagram showing another part of the properties pane;

FIG. 26 is a diagram showing another part of the properties pane;

FIG. 27 is a diagram showing another example of a properties pane;

FIG. 28 is a diagram showing a part of the properties pane;

FIG. 29 is a diagram showing another part of the properties pane;

FIG. 32 is a diagram showing an example of sort options;

FIG. 33 is a diagram showing another example of a properties pane;

FIG. 34 is a diagram showing another example of a properties pane;

FIG. 35 is a diagram showing another example of a properties pane;

DETAILED DESCRIPTION

Figure 1:
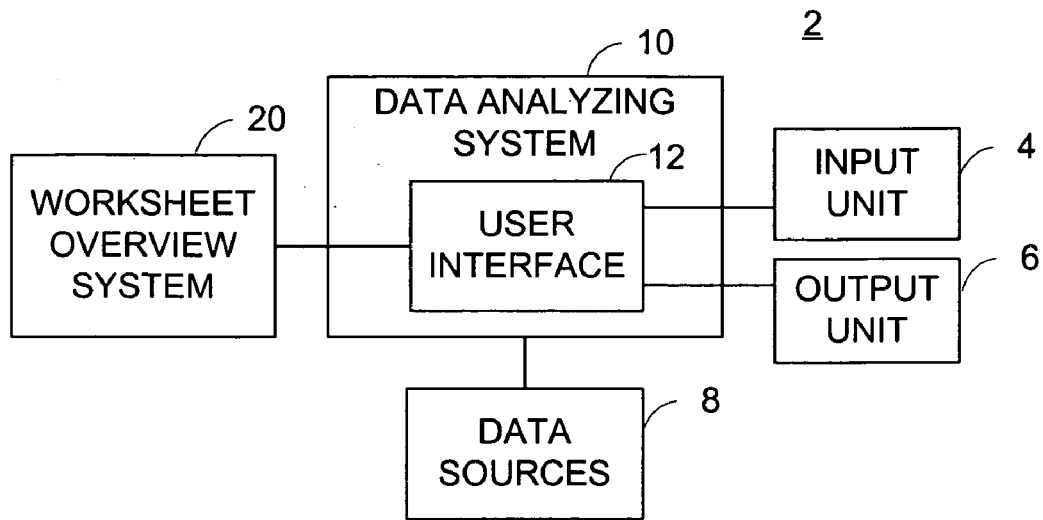
FIG. 1 is a block diagram showing a worksheet overview system in accordance with an embodiment of the present invention.

FIG. 1 shows a computer system 2 in which a worksheet overview system 20 is suitably used. The computer system 2 has an input unit 4 and an output unit 6. The worksheet overview system 20 suitably works with or within a data analyzing system 10, such as a business intelligence tool, that provides views or reports of data stored in one or more data sources 8. The worksheet overview system 20 manages an overview of a worksheet in a report generated by the data analyzing system 10. FIG. 1 exemplifies that the data analyzing system 10 is running on a single computer system 2. In a different embodiment, the data analyzing system 10 may be running on a computer unit that is part of a server-client system or any other computer system.

The data analyzing system 10 has a user interface 12 to receive user inputs through the input unit 4, and presents generated reports and other information to users through the output unit 6. The data analyzing system 10 is capable of generating reports containing a worksheet, such as a crosstab or a chart.

The worksheet overview system 20 typically works with or through the user interface 12 of the data analyzing system 10. The worksheet overview system 20 provides an overview area that presents an overview of a worksheet. An overview of a worksheet is a summary description of parts or items that constitute the current state of the worksheet. The worksheet overview system 20 allows users to use the overview area to interact with items of the worksheet and manipulate them, as further described below.

The overview area is a container for containing overview elements or icons. An overview element represents a summary description or information of one or more items (data sets) of the worksheet.

Figure 2:
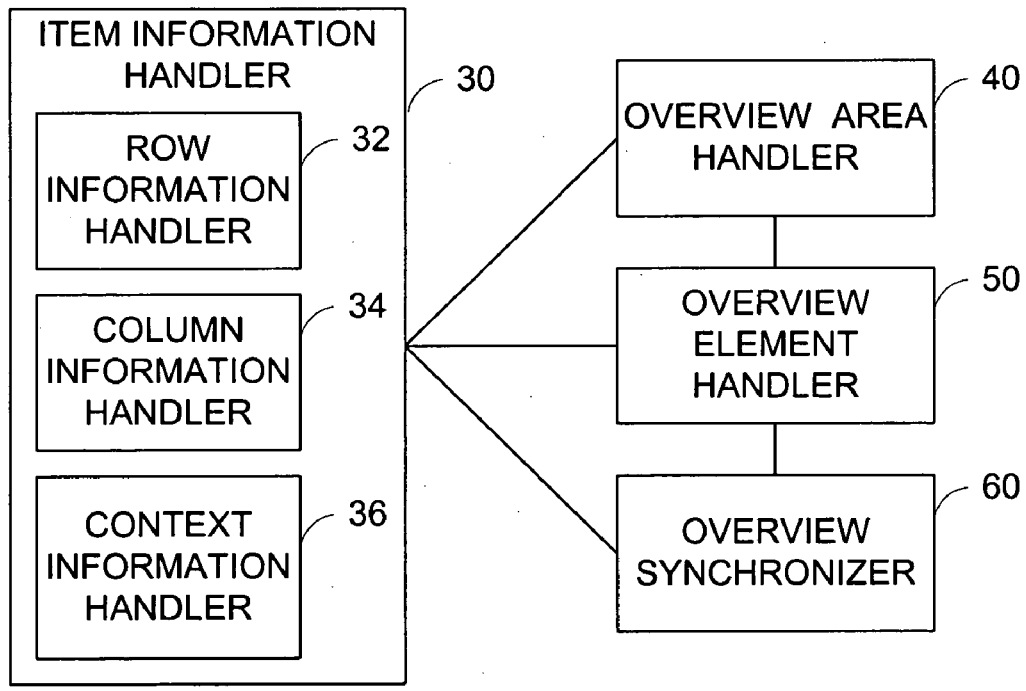
FIG. 2 is a block diagram showing an embodiment of the worksheet overview system.

As shown in FIG. 2, the worksheet overview system 20 has an item information handler 30, an overview area handler 40, an overview element handler 50, and an overview synchronizer 60.

The item information handler 30 manages information of items of the worksheet. The item information handler 30 obtains information regarding the items of the worksheet from the underlying data source or sources 8 or a metadata model that the report generating system 10 uses to generate reports for the data sources 8. The item information handler 30 has a row information handler 32, a column information handler 34, and a context information handler 36. When the worksheet overview system 20 deals with a crosstab, the row information handler 32 obtains information regarding one or more row data sets of the crosstab. Similarly, the column information handler 34 and the context information handler 36 obtain information regarding one or more column data sets and context of the crosstab, respectively. Context information includes filter criteria and/or other conditions applied to the crosstab as a whole.

The overview area handler 40 provides an overview area. Items of the worksheet are typically grouped according to the structure of the worksheet. The overview area handler 40 divides an overview area into multiple sections to correspond to the structural grouping of the items of the worksheet. For example, items of a crosstab are grouped by rows, columns and overall context. Thus, for a crosstab, the overview area has a row information section, a column information section, and a context information section.

The overview area handler 40 presents the overview area at a location on the screen of the output unit 6 where the overview area is easily seen by the user when its associated worksheet is fully or partially displayed. The overview area may be located above the worksheet below the toolbar on the screen.

The overview element handler 50 manages the presentation of overview elements, or icons. Each overview element represents information of one or more items of the worksheet. The overview element handler 50 uses the information obtained by the item information handler 30 to manage the presentation of overview elements. Also, it changes the presentation of overview elements depending on user's actions on the overview elements. When the worksheet is a crosstab, the item information handler 30 obtains information of row items, column items and context items of the crosstab. The overview element handler 50 presents overview elements representing row items in the row information section based on the information obtained by the item information handler 30. Similarly, the overview element handler 50 presents overview elements representing column items in the column information section, and overview elements representing context items in the context information section.

The overview element handler 50 provides each overview element with an item label indicating which item of the worksheet the overview element represents. The overview element handler 50 may provide an overview element having a menu for indicating details of the item information that the overview element represents and/or available options relating to the corresponding item or items of the worksheet. The overview element handler 50 allows the user to open and close the menu and select one or more desired options from the menu to act on the corresponding items in the worksheet, without actually accessing the items in the worksheet, as further described below.

The overview element handler 50 may provide a movable overview element, and allow the user to move the movable overview element between different sections in the overview area by using, e.g., a dragging and dropping action.

The overview element handler 50 allows users to manipulate overview elements in the overview area, such as creating or inserting new overview elements and modifying, interacting and deleting existing overview elements.

The overview synchronizer 60 handles synchronization between overview elements in the overview area and the corresponding items in the worksheet. When a worksheet is created, the overview synchronizer 60 obtains information relevant to the items of the worksheet using the overview element handler 50, and presents, in the overview area, overview elements representing the obtained item information using the overview element handler 50.

When the worksheet is changed, the overview synchronizer 60 reflects the changes to overview elements in the overview area through the overview element handler 50.

When the user changes overview elements in the overview area, the overview synchronizer 60 reflects the changes to the corresponding items of the worksheet. The changes made to the worksheet also changes the data in the overview area accordingly.

For example, when the user creates a new overview element in a row information section, the overview synchronizer 60 causes the data analyzing system 10 to add to the crosstab a new row data set that corresponds to the new overview element in the overview area. When the user deletes an overview element from a column information section in the overview area, the overview synchronizer 60 causes the corresponding column data set to be deleted from the crosstab. When the user selects an option, e.g., drilling up or down a hierarchy of items or searching an item, from the menu on an overview element in the overview area, the overview synchronizer 60 causes the crosstab to reflect the selection to show, e.g., drilled results or search results. When the user drags a movable overview element, e.g., from a row information section to a column information section, the overview synchronizer 60 causes the crosstab to change the row data set represented by the overview element into a column data set.

By creating overview elements in the overview area, the user may create a new worksheet.

The overview synchronizer 60 determines what information is relevant to the current status of the worksheet, and presents overview elements that represent the information relevant to the current status of the worksheet. For example, the overview synchronizer 60 causes the overview element handler 50 to present, in the context information section, overview elements representing the filters that are applied to the underlying worksheet, rather than showing a list of all filters which may or may not be applicable to the current status of the worksheet.

Thus, the worksheet overview system 20 presents in the overview area representations of the items in the worksheet, which assist users to understand what items make up the worksheet. This is especially advantageous when the worksheet is larger than the display area for the worksheet on the screen, and actual worksheet items represented by the overview elements are out of the view and cannot be seen without scrolling.

The worksheet overview system 20 allows users to interact on structural items that make up the worksheet through interacting with the overview elements in the overview area. As overview elements represent high-level items of the worksheet, the interaction (e.g. drill, search) with overview elements, is often easier and more intuitive for users than searching, selecting and acting on actual items or objects in the worksheet.

FIG. 3 shows an example of an overview area 100 presented by the overview system 20 for a crosstab 120. In this example, the overview area 100 is presented just above the associated crosstab 120. The overview area 100 has a row information section 102, a column information section 104 and a context information section 106.

The row information section 102 is provided to contain one or more overview elements that represent information of one or more row data sets of the crosstab. The column information section 104 is provided to contain one or more overview elements that represent information of one or more column data sets of the crosstab. The context information section 106 is provided to contain one or more overview elements that represent information of the context of the crosstab, e.g., information of filters and other contextual conditions of the crosstab.

The overall area 100 is dimensioned compact enough so that it can be kept visual on the screen when the entire or a part of associated crosstab is displayed. The information sections 102, 104 and 106 may be resizable individually or as a whole. The overall area 100 may provide movable partitions 108 between the information sections 102, 104 and 106. Each information section 102, 104, 106 may become scrollable when there are multiple overview elements in order to save the screen real estate. In this example, the information sections 102, 104 are 106 arranged in line to form a one-line overview area 100. In a different embodiment, the information sections 102, 104 and 106 may be arranged differently.

By using the overview area 100, the overall structure of the crosstab is captured in a single compact overview area, while providing separation of the information for the rows and columns from the context information.

In this crosstab 120, the rows are provided for dimension "Line" containing Dishwashers, Stoves and Microwaves as categories. Line is the parent category. The columns are provided for dimension "Date" containing 1993 and 1994 as categories. Date is the parent category. The values are shown for measure "Revenue".

For this crosstab 120, the overview system 20 provides the overview area 100 with two overview elements 110. One overview element 110 is labeled "Line" and presented in the row information section 102. The other overview element 110 is labeled "Date" and presented in the column information section 104. The context information section 106 is not filled out as currently there are no filters applied to the data shown in the crosstab 120.

When the user wants to filter the data in the crosstab 120 for the revenue in New York only, the user inserts a location category "NY" as a filter in the context information section 106, as shown in FIG. 4. Typically, the data analyzing system 10 provides a list or tree of categories, dimensions and/or measures available to create reports for the underlying data source or sources 8. The user may select Location "NY" from the list or tree, and drag and drop the NY item 112 into the context information section 106. In response to the insertion of the filter, as shown in FIG. 5, the overview element handler 50 creates a new overview element 114 in the context information section 106. The new overview element 114 is labeled "NY". The values in the crosstab 120 are also changed since the crosstab 120 now has a contextual filter "NY" applied to it.

Figure 6:
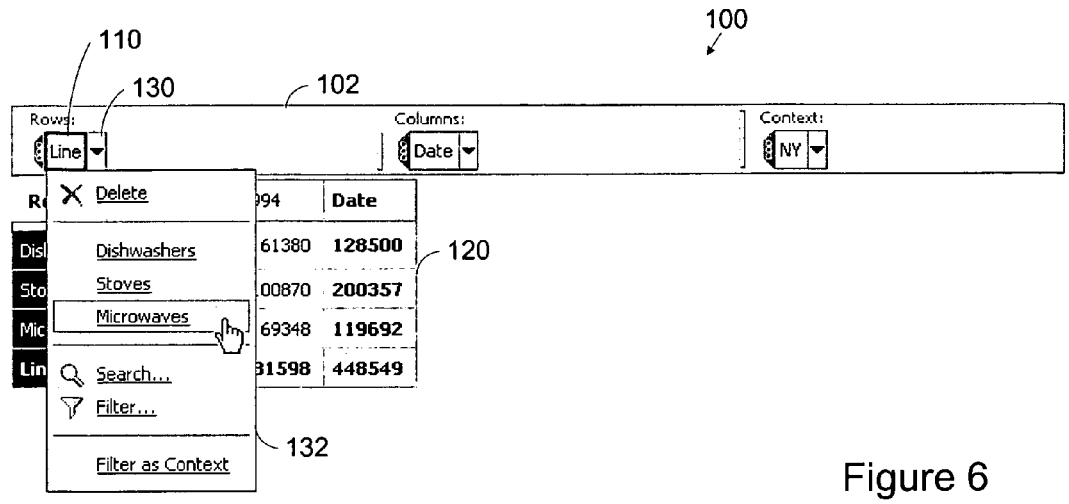
FIG. 6 is a diagram showing another example of an overview area.

The overview system 20 provides one or more menus through overview elements 110 in the overall area 100. Menus present available options to act on items in the crosstab 120 from the overview area 100, without the need to interact directly with the items in the crosstab 120. For example, as shown in FIG. 6, the user can select an arrow down button 130 of the overview element 110 labeled "Line" in the row information section 102 of the overview area 100 to open a menu 132. The menu 132 shows options available for the row items Line. By selecting a desired option, e.g., Microwaves, from the menu 132, the user is able to drill down on Microwaves. The selected items and corresponding overview elements become highlighted in the crosstab 120 and in the overview area 100 in synchronization.

Figure 7:
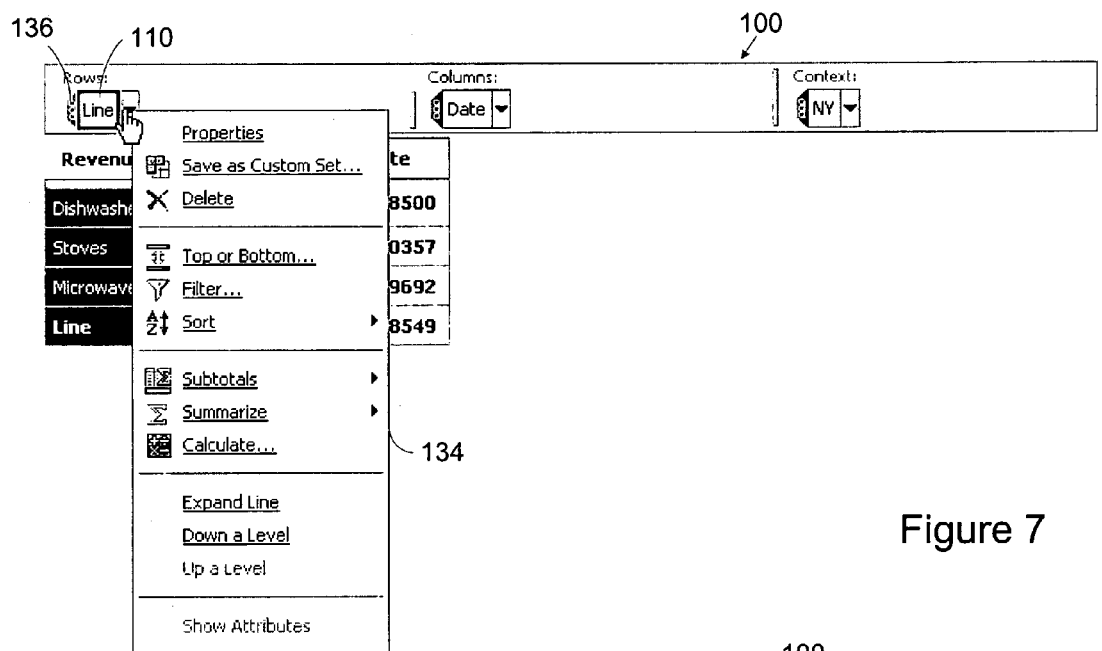
FIG. 7 is a diagram showing another example of an overview area.

The dropdown menu 132 is typically used to present options for the main functionality for the item represented by the overview element 110 in the overview area 100, such as categories shown in the crosstab 120 and filtering and navigation within the data. The overview system 20 may provide a different menu or an additional menu or menus. For example, as shown in FIG. 7, the overview system 20 may provide a context menu 134 showing options for other interactions, e.g. sort, top/bottom rule, and calculations. The context menu 134 may be invoked by, e.g., right-mouse clicking. The context menu 134 may be same as the menu available in the crosstab 120.

The user may select an overview element 110 by clicking on an item of the overview element 110. A movable overview element may have a handle, e.g., a dotted area 136 in FIG. 7, to indicate that the user can select and move the overview element.

Figure 8:
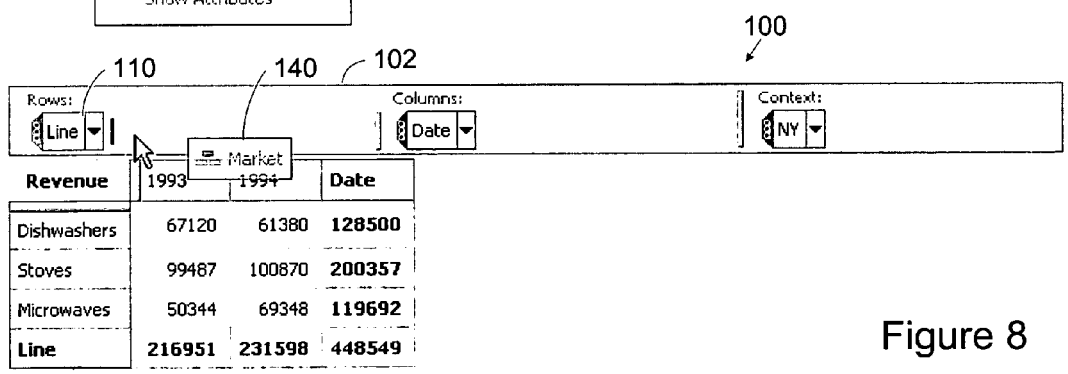
FIG. 8 is a diagram showing another example of an overview area.
Figures 9, 10:
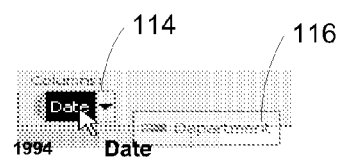
FIG. 9 is a diagram showing another example of an overview area.
FIG. 10 is a diagram showing an example of an overview element.

The overview system 20 allows the user to perform nesting of items using overview elements in the overview area 100. For example, as shown in FIG. 8, the user can drag an item "Market" 140 from a list of dimensions or items into the row information section 102 after the existing overview element 110 labeled "Line". After insertion, as shown in FIG. 9, a new overview element 112 labeled "Market" is created in the row information section 102 in the overview area 100, and the crosstab 120 is changed in synchronization to nest the market rows in the line rows. In this example, the market rows are for Builders, Furniture, Department Rental and Home.

The overview system 20 also allows replacement of items in the overview area 100 by drag-and-drop actions. As shown in FIG. 10, an item Date 114 highlighted in the columns may be replaced with item Department 116.

Figures 11, 12:
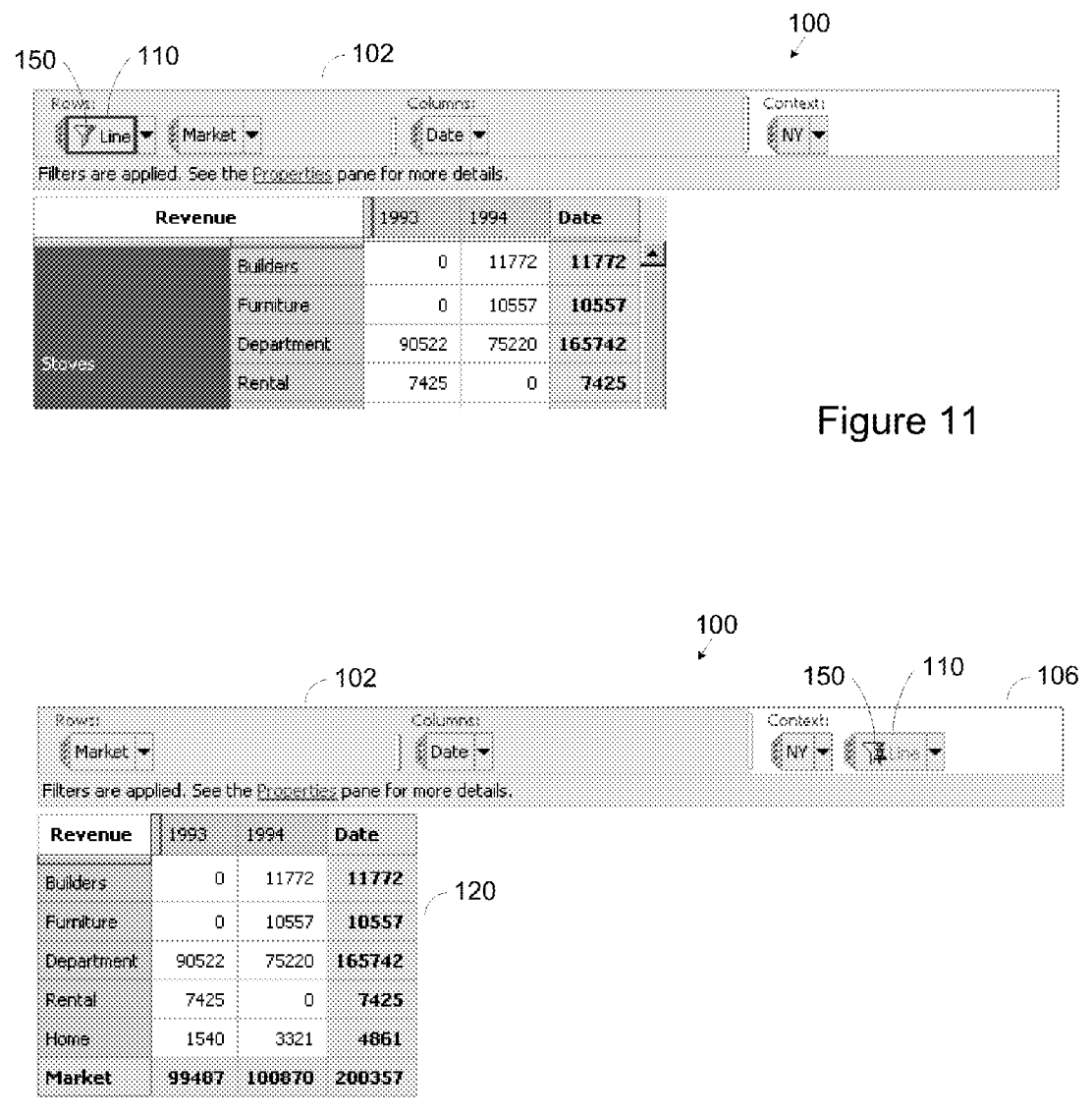

When one of the item sets in the crosstab 120 is filtered with an expression, the overview system 20 decorates the corresponding overview element 110 with a filtering symbol 150 representing that it is filtered, as shown in FIG. 11.

When the filtered row element 110 is moved to the context information section 106, the expression of the filter becomes a contextual filter that changes the data in the entire crosstab 120 such that all data in the crosstab 120 is filtered according to the expression. For example, as shown in FIG. 12, when the user moves overview element "Line" 110 with a filter 150 from the row information section 102 to the context information section 106, the filter 150 of the line is applied to the entire crosstab 120. The crosstab 120 now shows the Market categories as rows without nesting.

An item in the crosstab may consist of a list of items, instead of a parent category with its children categories as shown in the examples above. As shown in FIG. 13, the overview system 20 may add a term "list" 160 to an overview element 112 in the overview area 100 that represents an item consists of a list of items.

As demonstrated above with examples, the overview system 20 maintains a visual synchronization between the overview area 100 and the crosstab 120.

When there are too many overview elements in the rows, columns or context information sections 102, 104 and 106, the overview system 20 provides the ability to scroll in the overview information section 102, 104 or 106. The user can scroll the relevant information section 102, 104 or 106 using, e.g., arrow buttons 170 as shown in FIG. 14.

In addition to having the filter icon in front of an overview element label, the overview system 20 may show other icons to indicate what kind of functions are applied to that data set in the crosstab. Examples of functions include sorting and calculations. The example below shows the sorting function.

When sorting is applied to an item of the crosstab 120, the overview system 20 may indicate the application of the sorting using a set of arrows 172 in the corresponding overview element 110, as shown in FIG. 15.

Movable overview elements can be moved from one location in the overview area 100 to another, without the need to interact in the crosstab. As shown in FIG. 16, item Market can be moved from the rows to columns in the crosstab 120 by dragging the "Market" overview element or icon 112 from the row information section 102 to the column information section 104 in the overview area 100. The item being dragged may be represented by a ghosted element 118 near a mouse cursor 190.

The overview system 20 may also handle a case of a "union" in the row axis or the column axis. FIG. 16A shows an example of a crosstab 120 having a union in the row axis. In this case, the overview system 20 may represent the union by using a label "Combination" on the relevant overview element 162 in the row information section 102. The overview element 162 may also be made movable. As shown in FIG. 16B, a dropdown menu 164 for the combination overview element 162 may show two different data sets, Products and Locations, in this example. From this menu 164, the user may select a data set to open cascading menus 166 to delete or modify the settings of the union of the selected data set, as shown in FIG. 16C. The cascading menus 166 typically show the same options as those for overview elements that are not combined. The overview system 20 may also provide overview elements representing a combination nested with another data set. FIG. 16D shows an example of an overview area for a crosstab 120 in which a combination Channels nested in the Products. The overview system 20 presents an overview element 168 labeled "Channels" next to the combination overview element 162 in the row information section 102.

Figure 17:
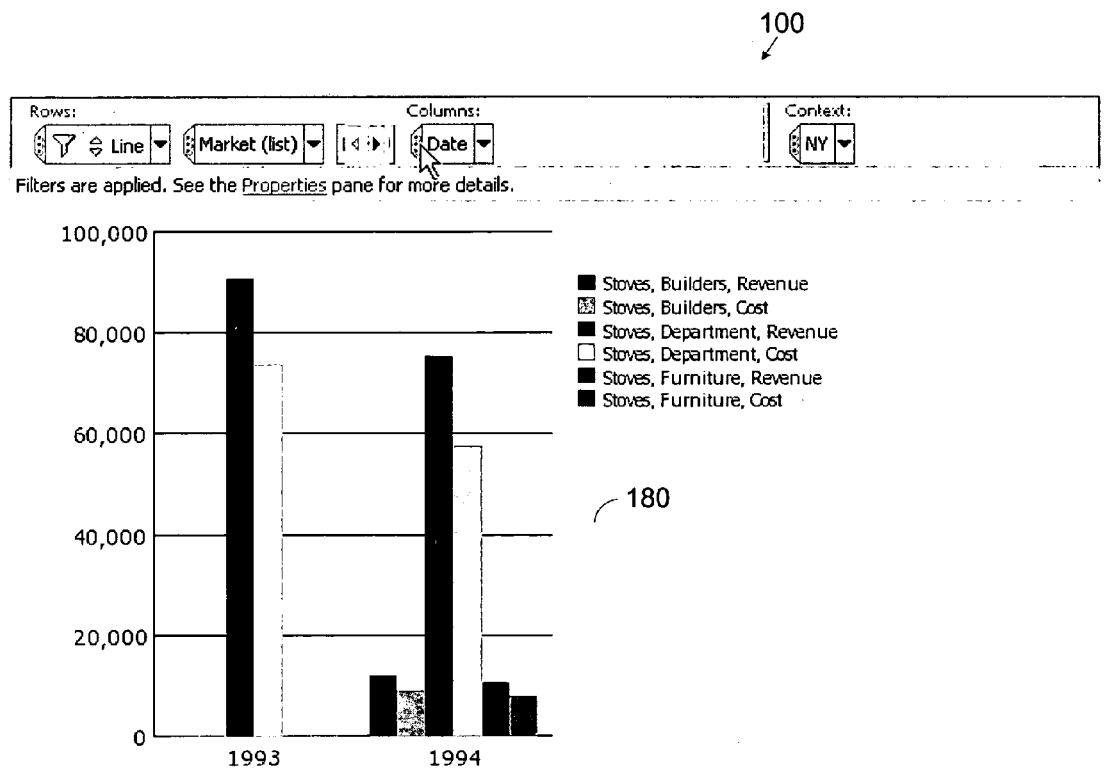
FIG. 17 is a diagram showing another example of an overview area.

As shown in FIG. 17, the overview system 20 may keep the overview area 100 visible when a chart 180 is shown in place of the crosstab. Showing the overview area 100 for the chart 180 prevents the need to learn another interaction model within the crosstab to change the data definition.

As exemplified above, the overview system 20 provides an overview area that provides an overview of items that make up the structure of a crosstab or chart. The overview area is compact enough to be presented together with the entire or a part of a crosstab or chart. Typically the overview area has one line or a few lines of overview elements arranged in multiple sections to represent the structure of the underlying crosstab or chart. The arrangement of overview elements may vary depending on the display design of the data analyzing system 10 with which the overview system 20 works. The overview system 20 provides a direct mapping between the selection in the overview area 100 and the selection in the crosstab or chart by synchronization in both directions.

Figure 18:
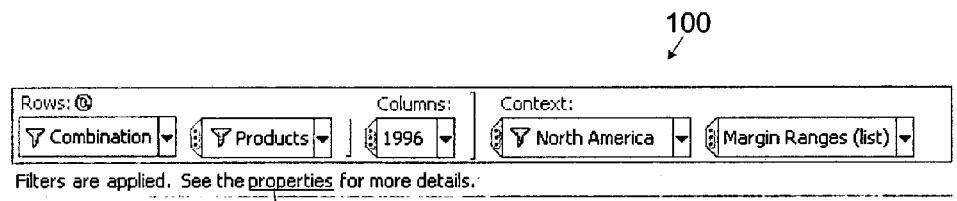
FIG. 18 is a diagram showing another example of an overview area.

FIG. 18 shows another example of an overview area 100. This example shows a link 202 to a property pane.

Figures 19, 20:
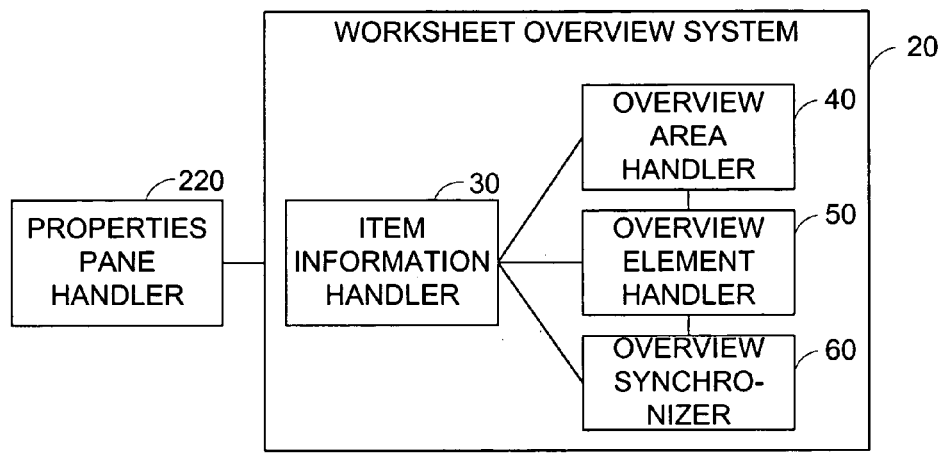
FIG. 19 is a block diagram showing a properties pane manager.
FIG. 20 is a diagram showing an example of a properties pane.

The overview system 20 may work with a properties pane manager 220 as shown in FIG. 19. Selecting the link 202 shown in FIG. 18 invokes the properties pane manager 220. The properties pane manager 220 may be also invoked from items in a worksheet or from a menu item at the top of the application.

The properties pane manager 220 provides a properties pane that shows properties of a selected item in a worksheet, e.g., selections and conditions applied to the selected item. The properties pane provides a quick and clear overview of the functionality applied to the selected item.

The properties pane handler 220 allows users to manipulate the properties of the item in the properties pane. This manipulation gives the users an ability to fine-tune their queries to answer the correct business questions.

The overview synchronizer 60 of the worksheet overview system 20 also synchronizes the properties pane handler 220. For example, when the user selects a data element in the worksheet overview system 20, the properties pane of the selected data element is also synchronized. The overview synchronizer 60 maintains synchronization among the worksheet, overview area, and properties pane.

FIG. 20 shows an example of a properties pane 230. The user opens the properties pane 230. When nothing is selected in the crosstab 120, the properties applicable to the entire crosstab 120 are shown in the properties pane 230.

The property pane 230 has a title bar 232 that reflects the name of the dimensional member associated with the selected item in the crosstab 120, or in the absence of a selection, the title bar 232 reflects the name of the analysis and/or the report title assigned by the user.

In this example, the property pane 230 shows the current properties of the entire crosstab relating to a default measure, rows, columns context and report options.

The default measure properties section indicates the currently selected measure and how the values are shown. The default measure properties section provides users with the ability to change these selections. When the user selects the current measure Revenue, a dropdown menu is opened to present a list of available measures, as shown in FIG. 21. When the user selects the show values selection, a dropdown menu is opened to present a list of available show values options, as shown in FIG. 22.

The rows properties section shows the name or names of the existing data sets in the rows of the crosstab. The user can click it, which will result in the selection of that item and showing the properties of that data set.

The columns properties section is similar to the rows properties section and shows the name or names of the existing data sets in the columns of the crosstab. The user can click it, which will result in the selection of that item and showing the properties of that data set.

The context properties section shows the filters that apply to the data values in the crosstab. If there is an expression, the context properties section shows the expression as full description. If there are multiple expressions and filters, the context properties section enumerates the multiple expressions in a continuous line (which can wrap as well)

The report options properties section shows the default options from a report options setting dialog. The user can modify these options by clicking on an overview element and navigate into the report options dialog.

FIG. 23 shows another example of a properties pane 240 when a different type of item or object is selected within the crosstab 120, e.g. "Line". The properties pane 240 has properties sections for display, definition, filter, context and sort.

The display properties section shows the properties that indicate what settings are set that influence the display of the selected data set. Some examples are shown in FIGS. 24 and 25. If the user wants to hide an item (e.g. Stoves) in the data set in the crosstab, the "No hidden items" is changed into "Hidden Items (1)", as shown in FIG. 26. The line for the "Display" may not stay in the same location when the text is longer. It may wrap to the next line as shown in FIG. 27.

The "Definition" line provides a specific selection of how the expression/definition for the selected data set will behave when the crosstab changes.

The filter, context and sort properties sections are related to how the "query" is behaving.

Figure 30:
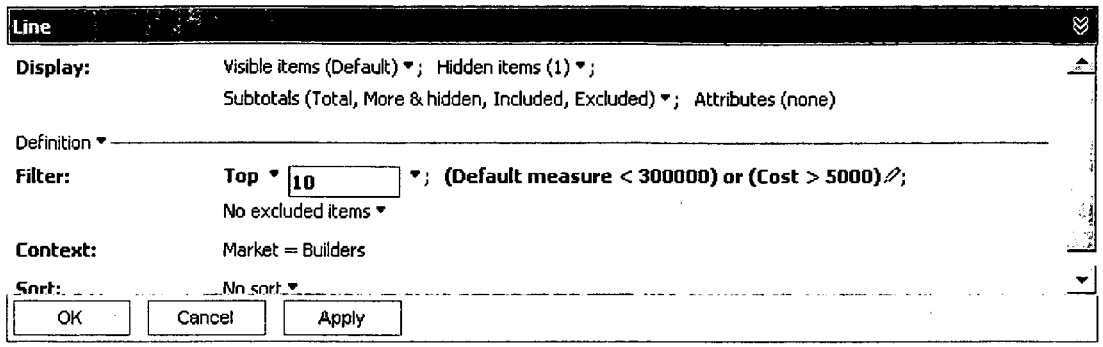
FIG. 30 is a diagram showing another example of a properties pane.

In the filter properties section, as shown in FIG. 28, the user may change "No top or bottom" to, e.g. "Top" and then, the user may immediately override the default value for the top 10 as shown in FIG. 29. The user may change "No expression" into a specific expression. When the user selects the edit overview element or the text itself, a dialog for the filter expressions appears for the user to create or edit the filter expression. Once the filter expression is created, the text in the filter properties section is updated, as shown in FIG. 30.

After the user changed the value of a certain property, that value is highlighted or bolded to indicate that the property value has been changed from its current setting. Changes to the properties is applied when an OK or Apply button is selected. This allows a number of property values changes to be made collectively, and applied once. This is an advantageous capability in a zero-footprint web application to minimize the number of server roundtrips required.

Figure 31:
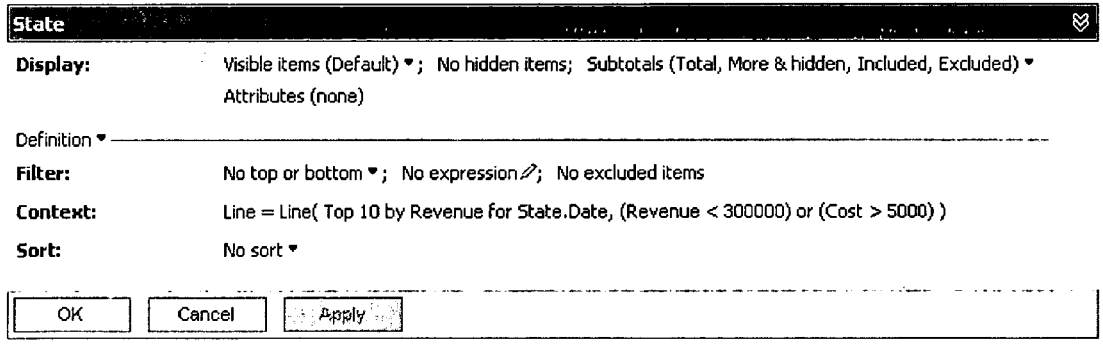
FIG. 31 is a diagram showing another example of a properties pane.

FIG. 31 shows an example of the selection of a data set later in the analysis process.

The data set "State" has a description of an expression filter for Context. This item fits in the properties pane. If an item has a longer description, the description is wrapped to a next text line so that the full text for the description can be shown.

The sort properties section provides a means to show what kind of sort is applied to the selected item. The user can interact with it to change the sort direction and on what can be sorted, as shown in FIG. 32.

Figure 36:
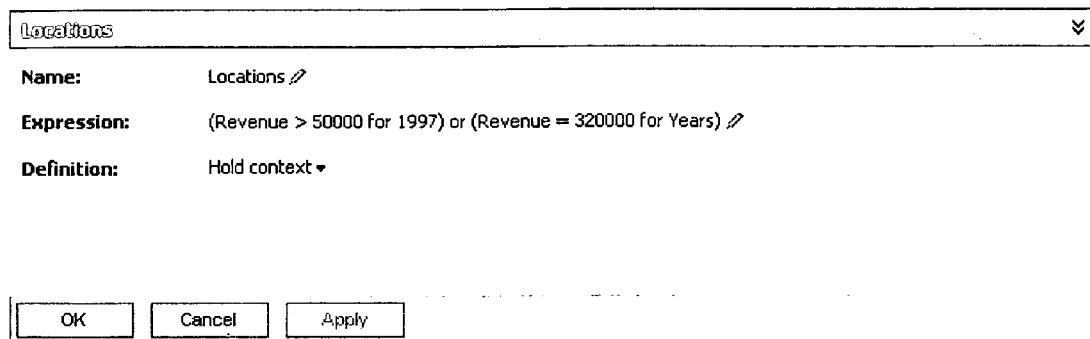
FIG. 36 is a diagram showing another example of a properties pane.
Figure 37:
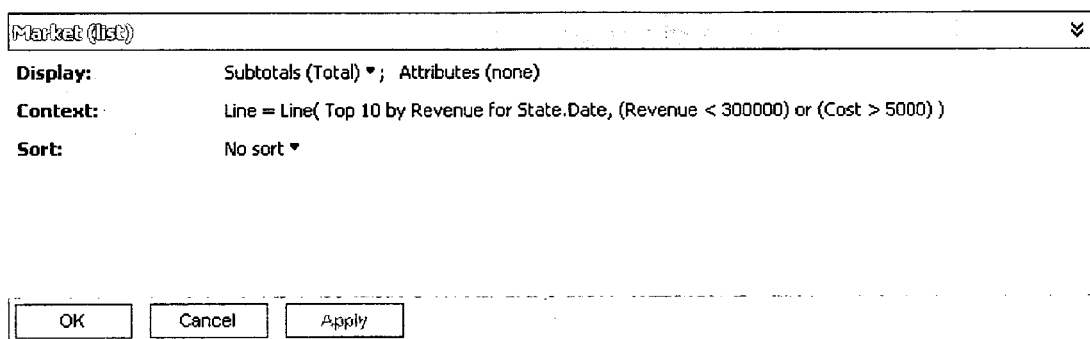
FIG. 37 is a diagram showing another example of a properties pane.
Figure 38:
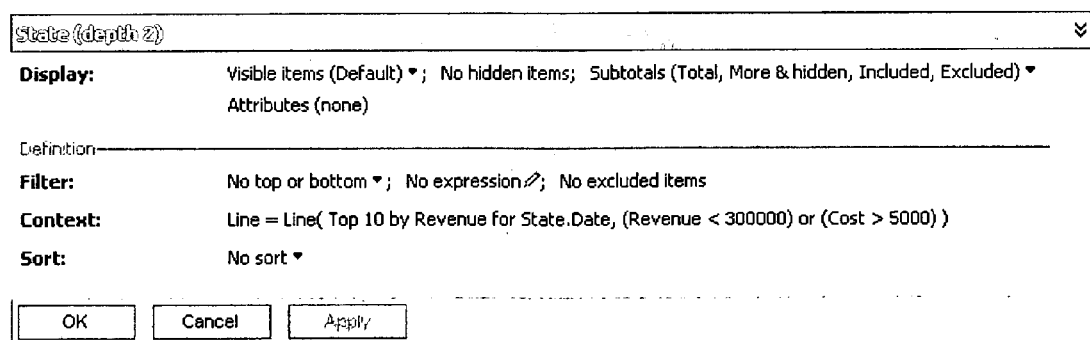
FIG. 38 is a diagram showing another example of a properties pane.

FIG. 33 shows an example of a properties pane for an individual category (member). FIG. 33 shows an example of a properties pane for a measure. FIG. 34 shows an example of a properties pane for an intersect value. FIG. 35 shows an example of a properties pane for a context filter. FIG. 36 shows an example of a properties pane for another type of set that has the properties of name, expression and definition. FIG. 37 shows an example of a properties pane for an item that has properties of display, context and sort. FIG. 38 shows an example of a properties pane for an item that has properties of display, filter, context and sort.

The properties pane manager 220 provides a properties pane for a selected item in the crosstab, with a text that is descriptive and easy to read to show what functions are applied to the selected item. The properties pane manager 220 provides the ability to interact with this functionality directly, without the need to invoke the function elsewhere. Because the text is descriptive and easy to read, business users can understand the fine-tuned applied functionality to elements of a report. The properties pane manager 220 also provides an interactive "footnote" idea to a selected item. It is possible to modify multiple functions at once, without applying it to the crosstab immediately. Within a properties pane, the properties pane manager 220 provides the ability to select another object available in the crosstab, and have also the properties shown for that object. The properties pane manager 220 can provide a combination of properties that is unique for a selected data set in a crosstab. The properties pane manager 220 allows wrapping of a long text in a properties pane. The properties pane manager 220 provides a properties pane that is a compact way to change settings of a crosstab or element of a crosstab and functions. The interaction with the individual properties is a part of the text. When the network connection is slow, it is useful for the end user to perform multiple actions in one submission, instead of having to submit each individual action. When the crosstab is large, there may also be a performance hit, since rendering the crosstab takes some time for a large crosstab. The properties pane manager 220 allows the user to perform multiple actions in one submission, which prevents a long waiting time.

The worksheet overview system of the invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the invention have been shown and described, changes and modifications may be made to such embodiments without departing from the scope of the invention. For example, the elements of the worksheet overview system are described separately, however, two or more elements may be provided as a single element, or one or more elements may be shared with other components in one or more computer systems.

What is claimed is:

1. A worksheet overview system, comprising:
at least one computer;
an item information handler executable by the at least one computer to obtain item information relating to items of a worksheet;
an overview element handler executable by the at least one computer to manage overview elements based on the item information, each overview element representing item information of a corresponding item of the worksheet;
an overview area handler executable by the at least one computer to provide an overview area for containing the overview elements to make the overview elements contained in the overview area accessible by a user; and
an overview synchronizer executable by the at least one computer to synchronize between each overview element in the overview area and its corresponding item of the worksheet, such that when a change is made to a particular overview element via user input received directly within the overview area, the overview synchronizer reflects the change to a corresponding item of the worksheet.

2. The worksheet overview system as claimed in claim 1, wherein the overview element handler allows a user to create a new overview element in the overview area, and manipulate, interact and delete an existing overview element in the overview area.

3. The worksheet overview system as claimed in claim 1, wherein
the worksheet has an item structure, according to which the items are grouped; and
the overview area handler provides multiple sections to represent the item structure of the worksheet.

4. The worksheet overview system as claimed in claim 3, wherein the overview element handler presents an overview element in a respective section of the overview area depending on the item that the overview element represents.

5. The worksheet overview system as claimed in claim 3, wherein the overview area handler provides in the overview area:
a row information section for containing overview elements representing items for rows of a crosstab;
a column information section for containing overview elements representing items for columns of the crosstab; and
a context information section for containing overview elements representing items relating context of the crosstab as a whole.

6. The worksheet overview system as claimed in claim 1, wherein the overview area handler provides the overview area adjacent to the worksheet and maintains the overview area visible to a user when at least a part of the worksheet is displayed.

7. The worksheet overview system as claimed in claim 1, wherein the item information handler has:
 a row information handler for obtaining information relating to rows in a crosstab;
 a column information handler for obtaining information relating to columns in the crosstab; and
 a context information handler for obtaining information relating to context of the crosstab as a whole.

8. The worksheet overview system as claimed in claim 1, wherein the overview element handler presents a movable overview element that is movable between different information sections in response to a user action on the movable overview element.

9. The worksheet overview system as claimed in claim 1, wherein the overview element handler provides a menu on an overview element to present options available for an item represented by the overview element.

10. The worksheet overview system as claimed in claim 9, wherein the overview element handler provides a menu including options for drilling up or down a hierarchy of items relating to the item represented by the overview element, sorting items shown on the worksheet, and/or searching an item in the worksheet.

11. A method of providing an overview of a worksheet, the method comprising:
 obtaining item information relating to items of a worksheet;
 providing an overview area on a display;
 presenting one or more overview elements in the overview area based on the item information, each overview element representing item information of a corresponding item of the worksheet; and
 synchronizing, by at least one computer, between each overview element in the overview area and its corresponding item of the worksheet, such that when a change is made to a particular overview element via user input received directly within the overview area, the change is reflected in a corresponding item of the worksheet.

12. The method as claimed in claim 11, further comprising allowing a user to create a new overview element in the overview area, and manipulate, interact and delete an existing overview element in the overview area.

13. The method as claimed in claim 11, wherein providing the overview area comprises providing multiple sections to represent an item structure of the worksheet, according to which the items are grouped.

14. The method as claimed in claim 13, wherein presenting the one or more overview elements comprises presenting an overview element in a respective section of the overview area depending on the item that the overview element represents.

15. The method as claimed in claim 13, wherein presenting the one or more overview elements comprises providing in the overview area:
 a row information section for containing overview elements representing items for rows of a crosstab;
 a column information section for containing overview elements representing items for columns of the crosstab; and
 a context information section for containing overview elements representing items relating context of the crosstab as a whole.

16. The method as claimed in claim 11, wherein providing the overview area comprises providing the overview area adjacent to the worksheet and maintains the overview area visible to a user when at least a pan of the worksheet is displayed.

17. The method as claimed in claim 11, wherein obtaining the item information comprises:
 obtaining information relating to rows in a crosstab;
 obtaining information relating to columns in the crosstab; and
 obtaining information relating to context of the crosstab as a whole.

18. The method as claimed in claim 11, wherein presenting the one or more overview elements comprises presenting a movable overview element that is movable between different information sections in response to a user action on the movable overview element.

19. The method as claimed in claim 11, wherein presenting the one or more overview elements comprises providing a menu on an overview element to present options available for an item represented by the overview element.

20. The method as claimed in claim 19 further comprising allowing the user to select options for drilling up or down a hierarchy of items relating to the item represented by the overview element, sorting items shown on the worksheet, and/or searching an item in the worksheet.

21. A computer readable storage medium storing instructions for execution by at least one computer to:
 obtain item information relating to items of a worksheet;
 provide an overview area on a display;
 present one or more overview elements in the overview area based on the item information, each overview element representing item information of a corresponding item of the worksheet; and
 synchronize between each overview element in the overview area and its corresponding item of the worksheet, such that when a change is made to a particular overview element via user input received directly within the overview area, the change is reflected in a corresponding item of the worksheet.

* * * * *